358-96.15

United States Patent
Keefe

[11] 3,781,555
[45] Dec. 25, 1973

[54] ULTRA-HIGH MOLECULAR WEIGHT POLYOLEFIN OPTICAL READER TIP

[75] Inventor: Jack D. Keefe, Dayton, Ohio

[73] Assignee: Monarch Marking Systems, Inc., Dayton, Ohio

[22] Filed: Jan. 2, 1973

[21] Appl. No.: 320,544

[52] U.S. Cl. .............................. 250/227, 350/96 B
[51] Int. Cl. ............................................. H01j 39/12
[58] Field of Search ................. 250/219 D, 219 DD, 250/219 DC, 227, 239; 235/61.11 E; 340/146.3 SU; 178/87; 179/100.4

[56] References Cited
UNITED STATES PATENTS

| | | | |
|---|---|---|---|
| 3,710,362 | 1/1973 | Kronfeld | 340/146.3 |
| 3,432,676 | 3/1969 | Lindberg | 250/227 |
| 3,711,723 | 1/1973 | McMurty | 250/219 D |
| 3,235,672 | 2/1966 | Beguin | 250/227 |

Primary Examiner—James W. Lawrence
Assistant Examiner—D. C. Nelms
Attorney—Richard D. Mason et al.

[57] ABSTRACT

There is disclosed an optical reader for reading a record having a wear resistant pen tip made from ultra-high molecular weight polyolefin such as polyethylene of about $1 \times 10^6$ to about $6 \times 10^6$ M.W. The user can hold the reader in his one hand and scan a binary coded record. In one embodiment, the pen has an elongated housing for mounting a record illuminator, a lens for gathering light reflected or diffused from the record, a mask having an aperture, and a light receptor spaced from the aperture which receives light passing through the aperture. In another embodiment, the polyolefin tip has optical fibers molded therein for transmitting light from the record to a light sensing means. The housing carries a removable, replaceable, tip which is composed of ultra-high molecular weight polyolefin having a low coefficient of friction and a natural lubricity.

11 Claims, 8 Drawing Figures

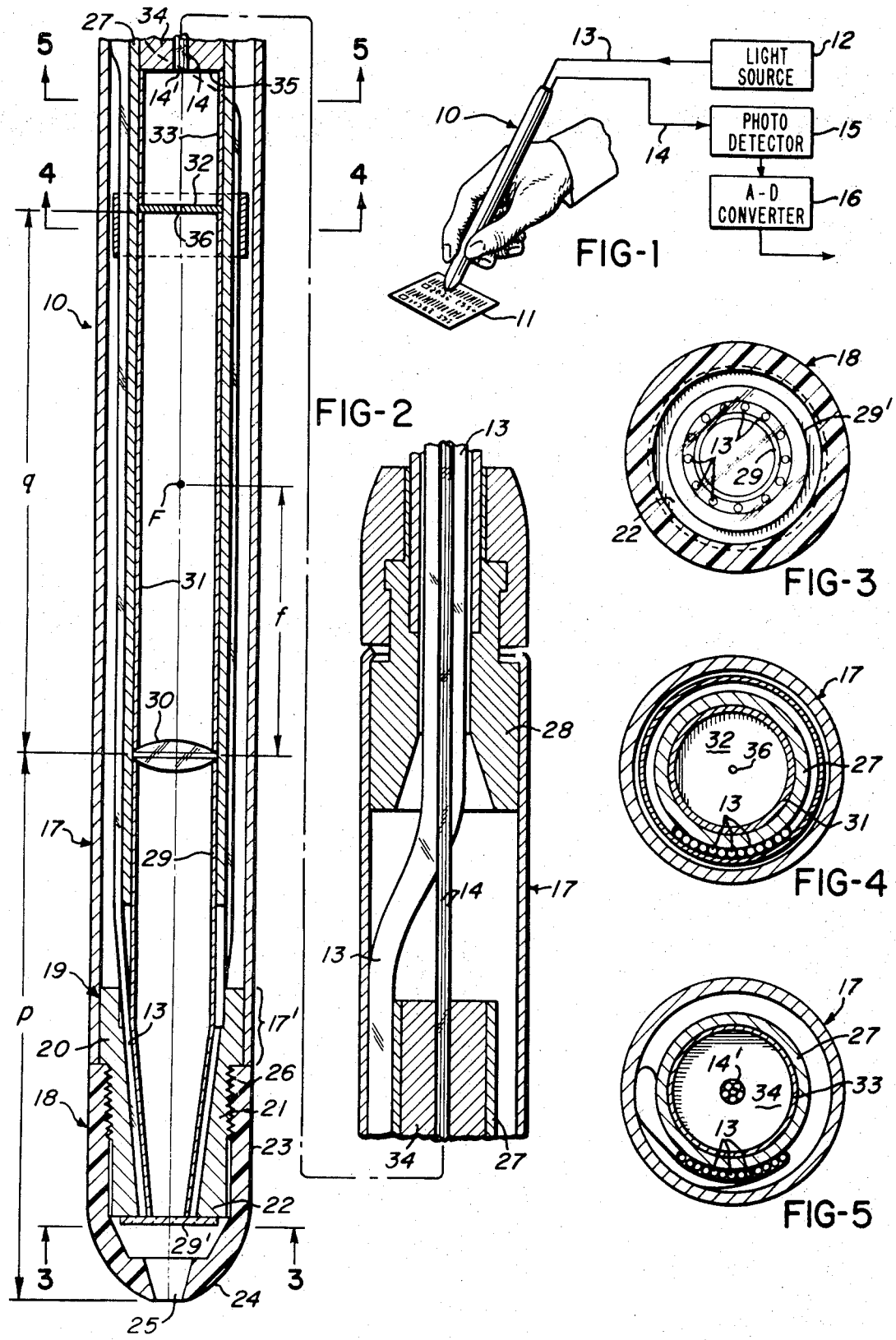

ULTRA-HIGH MOLECULAR WEIGHT POLYOLEFIN OPTICAL READER TIP

CROSS-REFERENCE TO RELATED APPLICATION

This application is an improvement over the application of Bruce W. Dobras, Ser. No. 104,894 filed on Jan. 8, 1971.

BACKGROUND OF THE INVENTION

1. Field of the Invention

This invention relates to the art of optical readers.

2. Description of the Prior Art

The prior art includes a number of patents relating to optical readers, such as United States Pat. Nos. 2,838,683; 2,933,612; 3,130,317; 3,182,291; 3,238,501; 2,247,391; 3,334,236; 3,349,246; 3,383,979; 3,417,234; 3,483,385 and 3,509,353. The ultra-high molecular weight polyolefins (about $1 - 6 \times 10^6$ M.W.) are disclosed in the following U.S. Pat.: Duling - 3,665,068; Mottus - 3,440,237; Cozewith et al. - 3,663,450; Cavender - 3,666,745 and 3,686,160; Lemiszka - 2,948,713; and British Pat. 851,051 and 858,674.

SUMMARY OF THE INVENTION

Tips for hand-held pens or readers, commonly used to read coded tickets and labels, are typically subjected to repeated strokes across such paper surfaces. In stationary readers, the surfaces of the tickets or labels move across the stationary tip. These surfaces are quite abrasive and it has been found that ordinary thermoplastic materials such as acetals, nylons, polytetrafluoroethylenes and polycarbonates are quickly worn away to the point of uselessness. Actually, use has proven that at best 5,000 strokes across a ticket is the most that can be expected from ordinary thermoplastics and as a consequence in first models it was ncessary to include many extra tips with the pens.

In attempting to remedy this problem, a stainless steel insert was placed at the point of the plastic tip. This, however, proved to be unsatisfactory because, while increasing the wear life many fold, even a highly polished steel insert marked the ticket badly, since the coefficient of friction was much too high. The stainless steel insert was also easily damaged when dropped or otherwise abused.

It has now been discovered that scanner tips made of ultra-high molecular weight polyolefins, preferably polyethylene, can outwear the heretofore known plastic scanner tips by at least a hundred fold. Actual tests have proven that scanner pen tips made from ultra-high molecular weight poleyethylene having a molecular weight of from about $1 \times 10^6$ to about $6 \times 10^6$, preferably from $1.5 \times 10^6$ to $6 \times 10^6$, will be usable after 500,000 strokes. Further, these tests on ultra-high molecular weight polyethylene which gave results of over 500,000 strokes were carried out under conditions more abusive than normal. In these tests, the same area of the pen tip was applied to the ticket or label in each stroke. In actual use, the wear would be more evenly distributed around the tip area. Under normal use, it is felt that at least one million strokes could be expected before wear becomes excessive to the point where replacement is necessary.

When these scanner optical readers are used across abrasive surfaces such as tickets and labels, it is essential that the scanner tip glide smoothly across the ticket with the application of the least possible amount of effort. It has been unexpectedly found that ultra-high molecular weight polyolefins not only possess a very low coefficient of friction across such materials but also have an unexplained natural lubricity. This material far surpasses any other material which was tried in terms of smoothness and ease of operation.

Another important and desirable characteristic of ultra-high molecular weight polyolefins is high impact resistance. In use, it can be expected that a scanner will be dropped from time to time damaging the tip. Because of impact resistance, tips made from ultra-high molecular weight polyolefins will suffer very little damage on being dropped. Usually, the damage that is done can be readily repaired. The damage which usually results from dropping the scanner pen is deformation of the scanner pen tip. This deformation sometimes results in a decrease in the size and/or shape of the opening in the tip in the one embodiment. With ultra-high molecular weight polyolefins, this damage can easily be repaired by inserting a small rigid member, such as a pencil tip, into the opening and reforming the hole.

Scanner tips made of ultra-high molecular weight polyethylene can be manufactured by machining, compression molding, and so on. The wear resistance of the new ultra-high molecular weight polyolefin tip makes it possible to mold the optical fibers into the pen tip as shown in the other embodiment. This operation would not be economically feasible with tips made from other materials.

BRIEF DESCRIPTION OF THE DRAWINGS

FIG. 1 is a perspective view of a hand-held optical reader in accordance with the invention being used to scan a record;

FIG. 2 is an elevational section view of the reader shown in FIG. 1, the reader being shown in two parts for clarity;

FIG. 3 is a sectional view taken along line 3—3 of FIG. 2;

FIG. 4 is a sectional view taken along line 4—4 of FIG. 2;

FIG. 5 is a sectional view taken along line 5—5 of FIG. 2; and

DESCRIPTION OF THE PREFERRED EMBODIMENT

Figure 6:
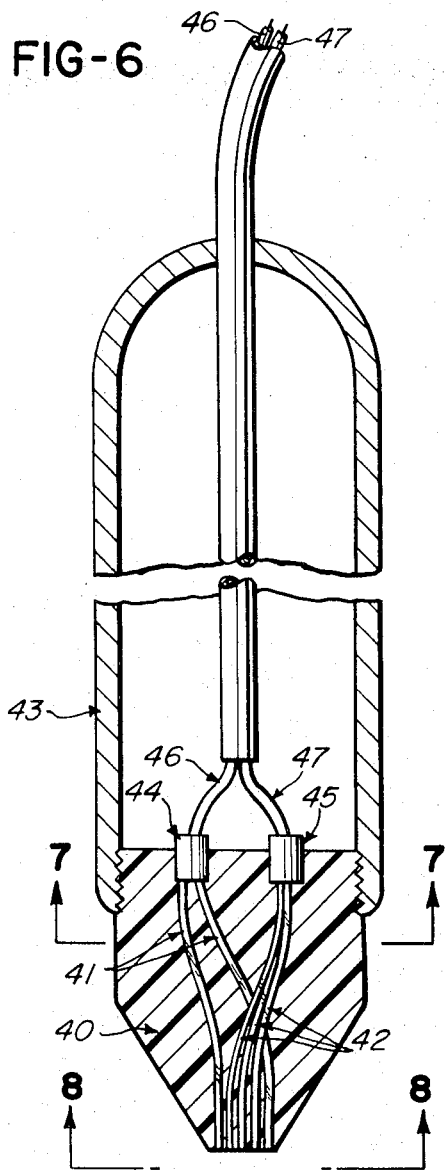
FIGS. 6 through 8 are views showing a scanning tip having optical fibers molded therein.

With reference to FIG. 1 there is shown a hand-held optical reader generally indicated at 10 which is capable of being moved relative to a stationary coded record member 11. The illustrated record member 11 is shown to have alternating bar-shaped areas with optically different characteristics, such as dark and light. The reader 10 is connected to a light source 12 by a bundle of optical fibers 13 which direct light from the source 12 to the record member 11. A bundle of optical fibers 14 conducts light from the reader 10 to a photodetector 15. The photodetector 15 senses the difference in the amount of reflected and diffused light received via optical fibers 14 as the reader 10 is moved relative to dark and light areas on the record member 11. The photodetector 15 applies an analog signal to an analog-to-digital converter 16 which in turn applies a digital signal to a utilization device (not shown).

The reader 10 includes an elongated housing 17 which can be conveniently held in the user hand as he scans the code data on the record member 11. Removably secured to the front of the housing 17 is a guide member in the form of an ultra-high molecular weight polyolefin tip 18. As the user moves the reader 10 across and in contact with the record member 11 to scan the code data on the record member 11, the tip 18 serves as a guide and therefore assures that the object distance p remains the same or substantially the same throughout the scanning movement.

A connector 19 has an annular portion 20 received by and securely held in a marginal end portion 17' of the housing 17. The connector 19 also has a threaded portion 21 and a reduced diameter portion 22. The threaded portion 21 is disposed between the annular portion 20 and the reduced portion 22. The tip 18 is shown to have a cylindrical portion 23 joined to a rounded end portion or face 24. The tip 18 has an opening 25 extending through the rounded end 24. The cylindrical portion 23 is internally threaded as indicated at 26 and is threadably received by the threaded portion 21 of the connector 19.

The bundle of optical fibers 13 extend into the housing 17 through a tubular section 27, into the space between the housing 17 and an inner sleeve 28, and into the connector 19 and the tip 18. As shown in FIGS. 2-5, the optical fibers 13 extend into the reader 10 as a bundle and spread out so that the ends of the fibers 13 which terminate at the end of the connector 19 are disposed in an annular array as best shown in FIG. 3. A sleeve 29 is shown in FIG. 2 to extend from the end of the connector 19 and the optical fibers 13 to the marginal edge of a lens 30. A transparent shield 29' adhesively secured to the end of the annular portion 22, closes off the space within the sleeve 29. Another sleeve 31 received in the sleeve 27 abuts the marginal edge of the lens 30 at its one end and a mask 32 at its other end. The sleeves 29 and 31 serve to mount the lens in a predetermined position inside the sleeve 27. Another sleeve 33 is shown to abut the mask 32 at its one end and a block 34 at its other end. The block 34 is received in and mounted by the sleeve 27. The block 34 mounts the end of the bundle of optical fibers 14. The end of the bundle of fibers 14 is shown to terminate at the end of the block 34. The surface 14' at the ends of the optical fibers 14 receive light from the tip opening 25 and is therefore called a light receptor. The inside surfaces of the sleeves 28, 29 and 33, opposite surfaces of the mask 32, and the surface 35 of the block 34 are preferably dull and blackened. The arrangement of the invention is such that the mask 32 is disposed between the lens 30 and the light receptor 14' and the lens 30 is disposed between the coded data on the record to be scanned and the mask 32. Importantly, light receptor 14' is spaced from the aperture 36 in the mask 32. The mask 32 is in the shape of a disk and has a central light aperture 36. The opening 25, the lens 30, the aperture 36 in the mask 32 and the receptor 14' are disposed in axial alignment with respect to each other. Light entering the reader 10 through the opening 25 is received by the lens 30 and is imaged by the lens 30 on the mask 32. The focal point F of the lens 30 is between the lens 30 and the mask 32. In the illustrated embodiment, the focal point F is half-way between the lens 30 and the mask 36, the focal length f is equal to one half the image distance $q$, and the image distance $q$ is equal to the object distance $p$. The lens 30 is located relative to the mask 32 and the record member 11 being scanned such that only light reflected or diffused from a small area on the record member proportional in size and shape to the aperture 36 in the mask 32 will pass through the aperture 36. In the illustrated embodiment, the size of the area being scanned on the record member 11 is equal to the size and shape of the aperture 36. Only the light energy passing through the light aperture 36 is received by the light receiving optical fiber end surface 14'. The sizing of the aperture 36 and the distance between the aperture 36 and the light receptor 14' is such that the light passing through the aperture 36 is directed against a substantial part and preferably the entire surface of the light receptor 14', but not such that the light also falls on the surface 35 of the block. Any light directed against surface 35 is lost and is not transferred to the photo-detector.

Figure 7:
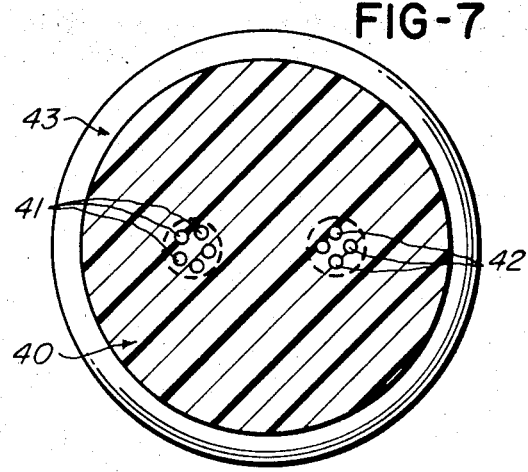

The one-piece tip 18 which is the improvement made herein, is constructed of an ultra-high molecular weight polyolefin having a low coefficient of friction. In use, the tip 18 of the reader 10 is in contact with the surface of the record member 11 as reader 10 is moved across the surface of the record member 11. Through continued use the rounded end 24 of the tip 18 will become worn. As the tip 18 is threadably secured to the end of the housing 18 it can be readily removed and replaced with a new tip like the tip 18. As the tip 18 is separate from the optical fibers 14 and as the lens 30, the mask 32 and the light receptor 14' are mounted in the housing 17 independent of the tip 18, removal and replacement of the tip is easily and readily accomplished. Referring now to FIG. 6, the new pen tip 40 has been molded together with optical fibers 41 and 42. The illuminating optical fibers 41 are usually best positioned to surround the recovery optical fibers 32 for best illumination of the portion of the record member contacted by the recovery fibers 42. The relative position of the preferred location of the optical fibers can best be seen in FIG. 8 which is a cross-sectional view of FIG. 6 cut across 8—8, showing the tip 40 attached to housing 43 and containing illuminating fibers 41 and recovery fibers 42. FIG. 7 is a cross-section of FIG. 6 cut across 7—7 showing tip 40 connected to housing 43 and containing illuminating fibers 41 and recovery fibers 42.

Referring back to FIG. 6, the illuminating fibers 41 and recovery fibers 42 are collected at the top of the ultra-high molecular weight polyethylene molded pen tip 40 in guide members 44 and 45. Guide member 44 separates and funnels the illuminating fibers 41 into a small area and guide member 45 separates and funnels the recovery fibers 42 into another small area so that each bundle of illuminating and recovery fibers within the guide members 44 and 45 can transmit light to or from a bundle of optical fibers. In FIG. 6, the illuminating fibers 41 are positioned by the guide member 44 so that each illuminating fiber can receive light from a bundle of optical fibers 46 and transmit this light to the record member. The recovery fibers 42 are positioned by guide member 45 to transmit light received from the record member into a bundle of optical fibers 47. The bundle of optical fibers 46 is connected to a light source (not shown) and the bundle of optical fibers 47 is connected to a photo detector (not shown) for recovering information from a record member as known in the art and as described with reference to FIG. 1.

Figure 8:
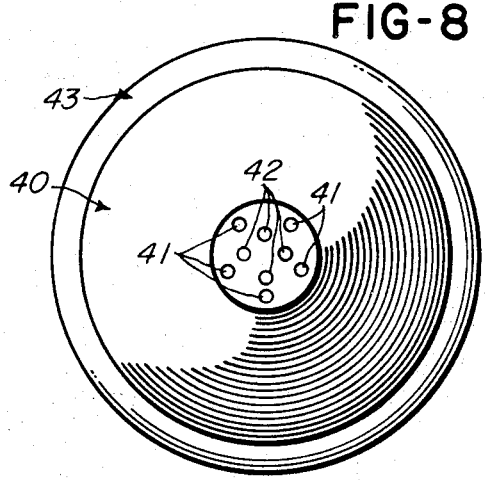

When the optical fibers are molded directly in the tip as described and shown with reference to FIGS. 6-8, the series of lenses and masks described with reference to FIG. 1 and designed to transmit the proper record image to the bundle of optical fibers 14 (FIG. 1), can be eliminated. The removable tip 40 can be attached to housing 43 as shown in FIG. 6 or can be snapped onto the housing, or removably attached to the housing in any other manner.

Of course both the housing 43 and the tip 40 can be made from the same ultra-high molecular weight polyolefin. In this manner, the entire pen could be molded into one piece. However, with this method when the tip becomes excessively worn, the entire pen would have to be discarded. Economics therefore suggests that the tip be made as a separate replaceable assembly.

Optical tips can be made from a variety of polyolefins having a molecular weight in the range of $1 \times 10^6$ to $6 \times 10^6$, such as:

1. Polyethylene with a molecular weight of about $1 \times 10^6$.
2. Polyethylene with a molecular weight of about $1.5 \times 10^6$ to $1.8 \times 10^6$ (A-C Polyethylene 1220 from Allied Chemical).
3. Polyethylene with a molecular weight of about $2.5 \times 10^6$ to about $3.5 \times 10^6$.
4. Polyethylene with a molecular weight of about $5 \times 10^6$ to about $6 \times 10^6$.
5. Polypropylene with a molcular weight of about $1 \times 10^6$ to about $2 \times 10^6$.

Each tip was found to have a life of more than 500,00 strokes under conditions more abusive than normal. Each tip has a very low coefficient of friction across tickets and labels and each exhibited a natural lubricity.

The preferred polyolefin is polyethylene; however any polyolefin having a molecular weight in the range of about $1 \times 10^6$ to about $6 \times 10^6$ can be used.

Other embodiments and modifications of this invention will suggest themselves to those skilled in the art, and all such of these as come within the spirit of this invention are included within its scope as best defined by the appended claims. It is to be understood that the method or apparatus used to direct light onto the record is not critical as long as there is sufficient light to be reflected up through the optical reader. Thus, the light could come from an outside source not connected to the optical reader.

I claim:

1. An optical reader for scanning a record member, comprising a housing having a tip which contacts the record member when the optical reader is in use, the tip being made of a polyolefin having a molecular weight of at least about $1 \times 10^6$.

2. An optical reader as defined in claim 1 wherein the tip is made of polyethylene having a molecular weight in the range of about $1.5 \times 10^6$ to about $6 \times 10^6$.

3. An optical reader as defined in claim 1 in which said polyolefin tip has at least one optical fiber molded therein.

4. An optical reader as defined in claim 1 which also comprises means for removably mounting the tip member to the housing.

5. An optical reader as defined in claim 1 further comprising means for illuminating the record member.

6. An optical reader as defined in claim 6 in which said record illuminating means comprises optical fibers having one end directed at a light source and another end directed at the record member.

7. An optical reader as defined in claim 7 wherein said record illuminating means are mounted within the housing.

8. An optical reader for scanning a record member comprising a housing and a tip having a record contacting face acting as a guide member when the optical reader is in use, wherein the tip is made from polyolefin having a molecular weight of at least about $1.5 \times 10^6$, and wherein the tip has molded therein a first optical fiber extending from a light source to the record contacting edge for illuminating the record member, and wherein the tip has molded therein a second optical fiber extending from the record contacting face to a means for sensing light conducted through the second optical fiber.

9. An optical reader as in claim 9 in which said tip is removable from the housing.

10. An optical reader as defined in claim 9 wherein the tip is polyethylene having a molecular weight in the range of about $1.5 \times 10^6$ to about $6 \times 10^6$.

11. In an optical reader for scanning a record member having a housing, a photodetector and a record contacting tip, the improvement comprising a record contacting tip made from a polyolefin having a molecular weight of at least $1 \times 10^6$.

* * * * *

PO-1050
(5/69)

UNITED STATES PATENT OFFICE
CERTIFICATE OF CORRECTION

Patent No. 3,781,555          Dated December 25, 1973

Inventor(s) Jack D. Keefe

It is certified that error appears in the above-identified patent and that said Letters Patent are hereby corrected as shown below:

Claim 6, line 1, the reference numeral "6" should read -- 5 --.

Claim 7, line 1, the reference numeral "7" should read -- 6 --.

Claim 9, line 1, the reference numeral "9" should read -- 8 --.

Signed and sealed this 23rd day of April 1974.

(SEAL)
Attest:

EDWARD M.FLETCHER,JR.
Attesting Officer

C. MARSHALL DANN
Commissioner of Patents